US009574877B2

(12) United States Patent
Sasaki

(10) Patent No.: US 9,574,877 B2
(45) Date of Patent: Feb. 21, 2017

(54) BAROMETRIC ALTIMETER FOR INDOOR USE

(71) Applicant: ASAHI KASEI KABUSHIKI KAISHA, Tokyo (JP)

(72) Inventor: Hiroyuki Sasaki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 24 days.

(21) Appl. No.: 14/440,628

(22) PCT Filed: Nov. 21, 2013

(86) PCT No.: PCT/JP2013/006844
§ 371 (c)(1),
(2) Date: May 5, 2015

(87) PCT Pub. No.: WO2014/087598
PCT Pub. Date: Jun. 12, 2014

(65) Prior Publication Data
US 2015/0292885 A1    Oct. 15, 2015

(30) Foreign Application Priority Data

Dec. 4, 2012    (JP) .................................. 2012-265111

(51) Int. Cl.
*G01L 7/20* (2006.01)
*G01C 5/06* (2006.01)
*G01C 25/00* (2006.01)

(52) U.S. Cl.
CPC ................. *G01C 5/06* (2013.01); *G01C 25/00* (2013.01)

(58) Field of Classification Search
CPC .................................. G01C 5/06; G01C 25/00
See application file for complete search history.

(56) References Cited

U.S. PATENT DOCUMENTS 2,412,541 A * 12/1946 Shivers ................. G01L 27/005
236/74 R
3,958,459 A * 5/1976 Shimomura ............. G01C 5/06
377/19

(Continued)

FOREIGN PATENT DOCUMENTS

JP    H01-307614 A    12/1989
JP    2007-309941 A    11/2007

(Continued)

OTHER PUBLICATIONS

International Preliminary Report on Patentability dated Jun. 9, 2015, for corresponding International application No. PCT/JP2013/006844.

(Continued)

*Primary Examiner* — Harshad R Patel
*Assistant Examiner* — Samir M Shah
(74) *Attorney, Agent, or Firm* — Morgan, Lewis & Bockius LLP

(57) ABSTRACT

There is provided a barometric altimeter to detect a floor number at the current position in especially a high-rise building, and to calculate a height or a floor number more precisely. To this end, a barometric altimeter (100) stores, at a barometric pressure/height conversion coefficient storage unit (2), a plurality of barometric pressure/height conversion coefficients that is calculated beforehand based on temperature of air indoors in accordance with a month and a date, and an arithmetic expression, for which the plurality of barometric pressure/height conversion coefficients are used. For the actual operation, while a reference barometric pressure measurement/storage unit (1) measures and stores a barometric pressure at a position as reference barometric pressure, a current barometric pressure measurement unit (3) measures the barometric pressure at the position to be measured. Then a height calculation unit (5) calculates the (Continued)

height through predetermined calculation using the result of processing at these blocks.

10 Claims, 3 Drawing Sheets

(56) References Cited

U.S. PATENT DOCUMENTS

| | | | | |
|---|---|---|---|---|
| 4,253,335 | A * | 3/1981 | Shimomura | G01C 5/06 73/384 |
| 4,539,843 | A * | 9/1985 | Wise | G01C 5/06 73/179 |
| 5,224,059 | A * | 6/1993 | Nitta | G01C 5/06 368/11 |
| 6,678,629 | B2 * | 1/2004 | Tsuji | G01C 5/06 702/138 |
| 7,095,364 | B1 * | 8/2006 | Rawdon | G01S 13/08 342/118 |
| 7,424,825 | B2 * | 9/2008 | Saporito | G04G 21/02 73/384 |
| 7,908,921 | B2 * | 3/2011 | Binda | G01C 5/06 73/384 |
| 8,180,591 | B2 * | 5/2012 | Yuen | A61B 5/0002 702/160 |
| 2006/0000286 | A1 * | 1/2006 | Makela | G01C 5/06 73/700 |
| 2006/0106559 | A1 * | 5/2006 | Lerch | G01C 5/00 702/94 |
| 2007/0266783 | A1 | 11/2007 | Saporito et al. | |
| 2009/0286556 | A1 * | 11/2009 | Yumoto | G01C 21/20 455/456.6 |
| 2010/0007552 | A1 * | 1/2010 | Oda | G01S 19/48 342/357.43 |

FOREIGN PATENT DOCUMENTS

| | | |
|---|---|---|
| JP | 2009-281741 A | 12/2009 |
| JP | 2010-038895 A | 2/2010 |
| JP | 2011-117818 A | 6/2011 |

OTHER PUBLICATIONS

International Search Report dated Dec. 17, 2013, for International Application No. PCT/JP2013/006844.

* cited by examiner

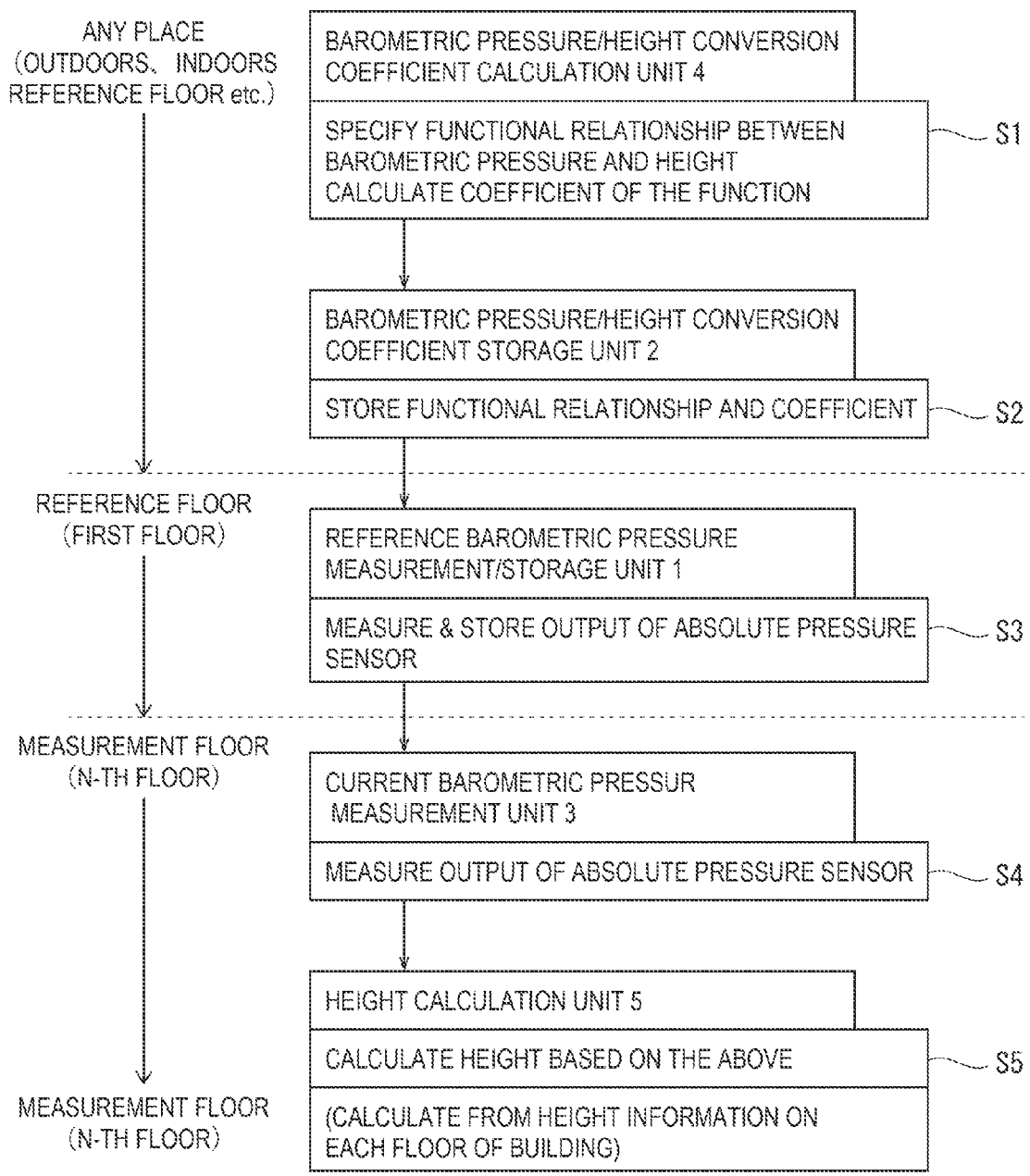

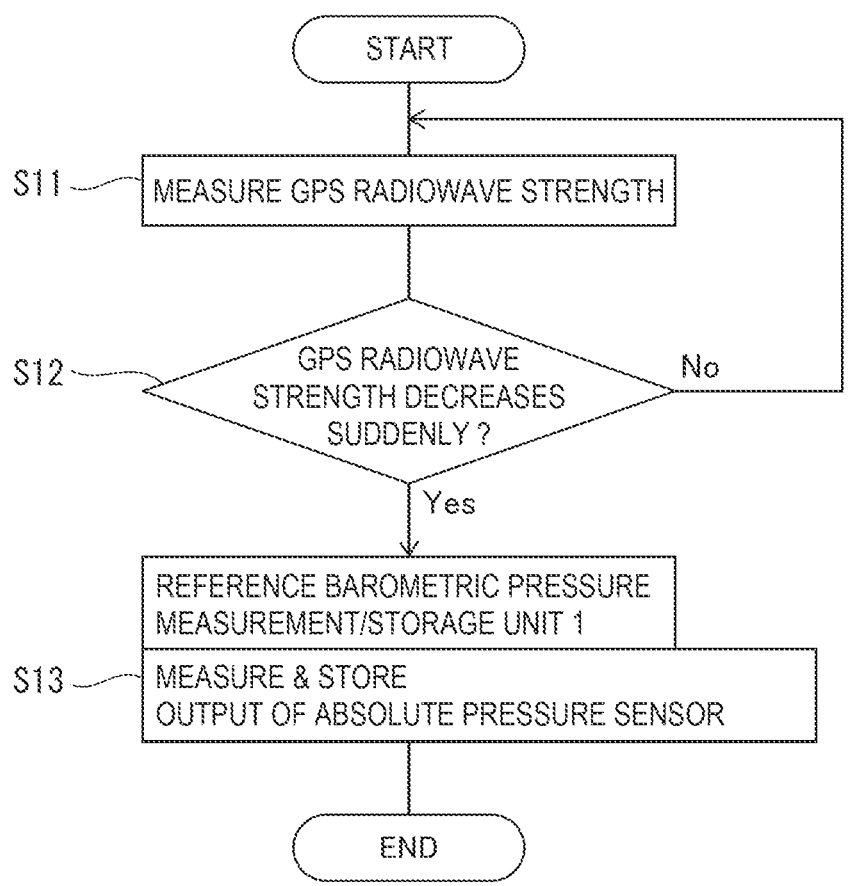

BAROMETRIC ALTIMETER FOR INDOOR USE

TECHNICAL FIELD

The present invention relates to a barometric altimeter and a barometric altimeter for indoor use.

BACKGROUND ART

Conventionally a technique of measuring a height or an altitude (height in vertical direction above sea level 0 m) using a barometric altimeter is known. This technique for measurement is used in some cases on earth as in the measurement of the current height during mountain climbing, or is used in other cases high in the sky that is in the atmosphere away from the earth as in the measurement of the height of an airplane.

Such a barometric altimeter measures the height based on the following principle.

That is, air present at some part on earth receives force corresponding to the weight of air above the part in the sky from the vertically above (from the sky) of the air due to the attractive force (gravity) of the earth. This means that the amount or the density of air is always more (larger) on the surface of the earth than in the sky, resulting in that the pressure of air, i.e., the barometric pressure also is always higher on the surface of the earth than in the sky. Assuming that air is ideal gas, it is well known as the theory of hydrodynamics that the barometric pressure decreases in an exponential manner as it moves up in the sky (with an increase in height).

The barometric altimeter often measures barometric pressure using a sensor generally called an absolute pressure sensor. This absolute pressure sensor is capable of measuring the barometric pressure in the atmosphere with reference to vacuum (0 barometric pressure or 0 hectopascal). As is commonly said as a high pressure system and a low pressure system, a change in barometric pressure is based on a change in weather, or conversely a change in barometric pressure can be an important index to forecast a change in weather. The absolute pressure sensor measures the barometric pressure as the index, and a similar sensor is used for the barometric altimeter as well.

As stated above, the barometric altimeter is configured to find the height or the altitude by measuring the barometric pressure using an absolute pressure sensor or the like. That is, in order to find the height or the altitude from the barometric pressure measured by the absolute pressure sensor or the like, a certain functional relationship between the barometric pressure and the height has to be found. For the practical operation, a qualitative relationship of just a decrease in an exponential manner as in the above-mentioned ideal gas is not sufficient, and another functional relationship that is more quantitative has to be found, for example.

A technique for such a functional relationship is disclosed in Patent Literature 1. This technique is to select a reference temperature T0 at the sea level 0 m based on the climate zones (temperate, tropical and polar) and the date in the following relational expression specified by the international standard indicating the relationship among the height, the barometric pressure and the temperature, and to find the height H from the barometric pressure P0 at the sea level 0 m and the barometric pressure P at the measurement position:

$$H = 15385 \times T0 \times [1-(P/P0)^{0.190255}].$$

CITATION LIST

Patent Literature

PTL 1: JP 2007-309941

SUMMARY OF INVENTION

Technical Problem

The invention described in PTL 1 is based on the prerequisite that the barometric altimeter is used outdoors, which is easily guessed from how to find the height H. This is because information on the climate zone is necessary to find the height H, meaning that the air temperature, i.e., the outdoor temperature is a target to be measured. Further, it requires the value of barometric pressure at the sea level 0 m, meaning that the measurement has to be performed at a place clearly indicating the sea level 0 m, i.e., outdoors like along the shoreline.

Meanwhile, many buildings called high-rise buildings or skyscrapers have been constructed especially in the urban area recently, and so the situation of requiring to tell "what floor are we on now" often occurs. That is, the situation of measuring "what floor we are on now" occurs by applying the principle of a barometric altimeter that is configured based on outdoor use as prerequisite to indoor use as well.

In general, the outdoor height as a target in Patent Literature 1 can be measured using a GPS (Global Positioning System) in many cases.

In the case of indoor use, however, radiowaves of GPS do not reach there, meaning that the height cannot be measured in most cases. That is, applications of the barometric altimeter are currently required more for the indoor height measurement, in which the height cannot be measured using a GPS, rather than outdoor.

In view of such a circumstance, the present invention aims to provide a barometric altimeter and a barometric altimeter for indoor use that are capable of detecting the height precisely by using a barometric altimeter indoors that is different from the conventional prerequisite.

Solution to Problem

In one aspect of the present invention, a barometric altimeter includes: a pressure sensor (e.g., an absolute pressure sensor 3a illustrated in FIG. 1); a reference barometric pressure measurement/storage unit (e.g., a reference barometric pressure measurement/storage unit 1 illustrated in FIG. 1) configured to store a barometric pressure measurement by the pressure sensor at a height as reference barometric pressure; a barometric pressure/height conversion coefficient storage unit (e.g., a barometric pressure/height conversion coefficient storage unit 2 illustrated in FIG. 1) configured to store a plurality of barometric pressure/height conversion coefficients to convert a barometric pressure measurement by the pressure sensor to a height, the barometric pressure/height conversion coefficients being calculated beforehand based on temperature of air indoors in accordance with a month and a date, and an arithmetic expression, for which the plurality of barometric pressure/height conversion coefficients are used; and a height calculation unit (e.g., a height calculation unit 5 illustrated in FIG. 1) configured to receive height-measurement month and date information as an input, and calculates a height or a variation in height at an indoor measurement position on a basis of the reference barometric pressure and the arithmetic expression including a barometric pressure/height conversion coefficient corresponding to the height-measurement month and date information among the plurality of barometric pressure/height conversion coefficients and on a basis of a barometric pressure measurement by the pressure sensor at the indoor measurement position.

The barometric altimeter further may include an indoor determination unit (e.g., processing at Step S11 and Step S12 illustrated in FIG. 3) configured to detect whether the pressure sensor is present indoors.

The indoor determination unit may detect whether the pressure sensor is present indoors or not based on a radio signal having different signal strength between indoors and outdoors.

The radio signal may be a WiFi signal or a GPS signal.

The barometric altimeter may further include a barometric pressure/height conversion coefficient calculation unit (e.g., a barometric pressure/height conversion coefficient calculation unit 4 illustrated in FIG. 1) configured to calculate the barometric pressure/height conversion coefficients based on temperature of air indoors to be input, and the barometric pressure/height conversion coefficient calculation unit may calculate the barometric pressure/height conversion coefficients based on temperature of air indoors and molecular weight or humidity of air indoors.

The barometric altimeter may further include a barometric pressure/height conversion coefficient calculation unit (e.g., a barometric pressure/height conversion coefficient calculation unit 4 illustrated in FIG. 1) configured to calculate the barometric pressure/height conversion coefficients based on temperature of air indoors to be input; and a humidity sensor configured to measure humidity indoors, and the barometric pressure/height conversion coefficient calculation unit may calculate the barometric pressure/height conversion coefficients based on temperature of air indoors and humidity indoors that is measured by the humidity sensor The barometric altimeter may further include a temperature sensor configured to measure temperature of air indoors, and the barometric pressure/height conversion coefficient calculation unit may calculate the barometric pressure/height conversion coefficients based on measurements by the temperature sensor.

The barometric pressure/height conversion coefficients may be set in accordance with four seasons, and a season when a height is measured may be input as the height-measurement month and date information.

In another aspect of the present invention, a barometric altimeter for indoor use includes: a height-measurement month and date information input unit (e.g., an input unit 4a illustrated in FIG. 1) configured to receive height-measurement month and date information as an input; and an indoor height information output unit (e.g., a height calculation unit 5 illustrated in FIG. 1) configured to output a value of height indoors or a variation in the height indoors based on the height-measurement month and date information.

The barometric altimeter for indoor use may further include a display (e.g., a display 5a illustrated in FIG. 1) configured to display the value of height indoors or a variation in the height indoors.

The height-measurement month and date information may be information on seasons.

The barometric altimeter for indoor use may further include a calendar, and the height-measurement month and date information input unit may acquire the height-measurement month and date information from the calendar.

Advantageous Effects of Invention

According to one aspect of the present invention, a barometric altimeter for indoor use can measure a height more precisely based on a quantitative functional relationship between barometric pressures and heights indoors.

Specially, although a barometric altimeter conventionally used for mountain climbing or the like, when it is used indoors as it is, leads to erroneous detection just for several floors, the barometric altimeter of the present invention can detect the current height (floor number) of a high-rise building precisely.

BRIEF DESCRIPTION OF DRAWINGS

FIG. 2 is a flowchart illustrating the procedure in order in the embodiment of FIG. 1; and FIG. 3 is a flowchart illustrating exemplary processing at a previous step by the reference barometric pressure measurement/storage unit 1 in the flowchart of FIG. 2.

DESCRIPTION OF EMBODIMENTS

Figure 1:
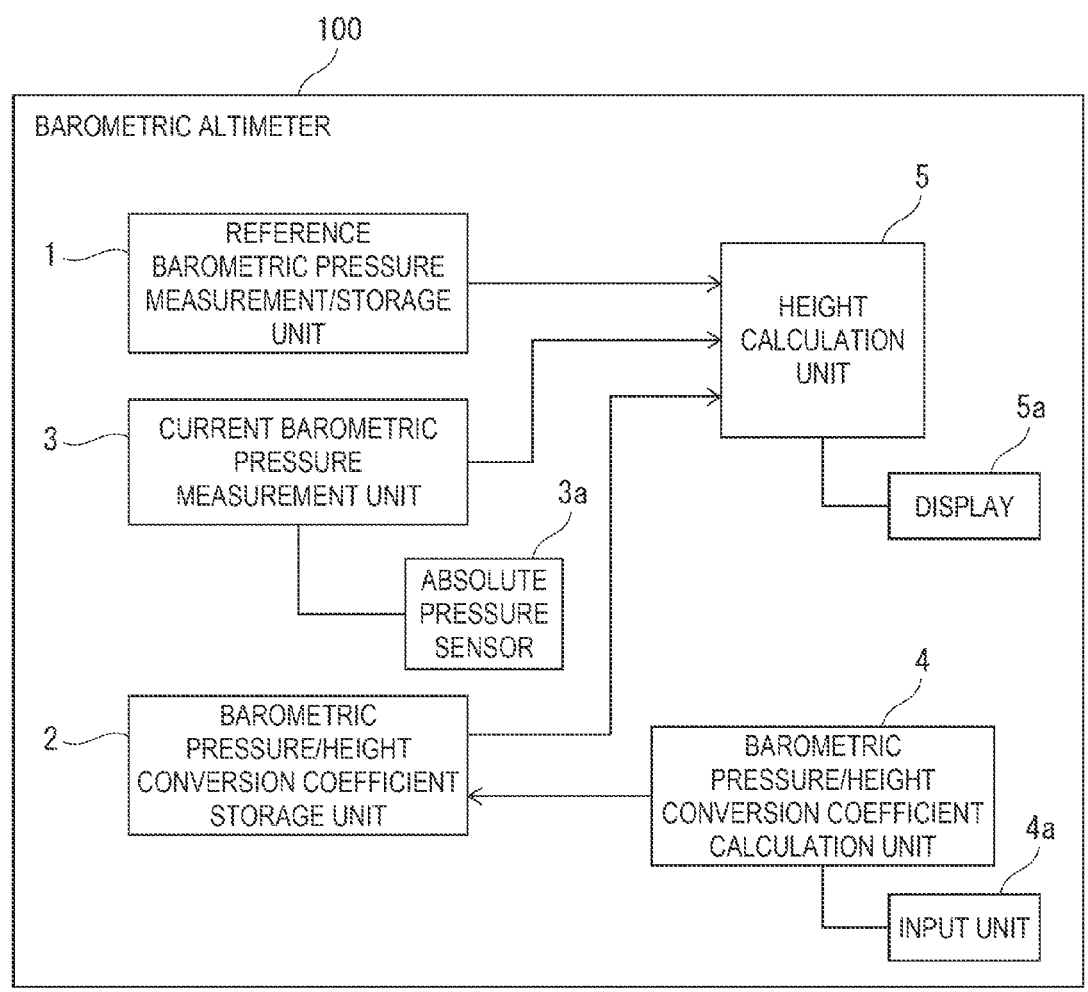
FIG. 1 is a block diagram illustrating an exemplary configuration of one embodiment of a barometric altimeter according to the present invention.

Embodiments of the present invention will now be described with reference to the drawings.

Configuration of Embodiment

FIG. 1 is a block diagram illustrating an exemplary configuration of one embodiment of a barometric altimeter 100 according to the present invention. This barometric altimeter 100 measures what floor a user is on now in the building.

The barometric altimeter 100 illustrated in FIG. 1 includes a reference barometric pressure measurement/storage unit 1; a barometric pressure/height conversion coefficient storage unit 2; a current barometric pressure measurement unit 3; a barometric pressure/height conversion coefficient calculation unit 4; and a height calculation unit 5.

The reference barometric pressure measurement/storage unit 1 is a block to store the barometric pressure measured by an absolute pressure sensor at some position as a reference value (hereinafter called a reference barometric pressure as well). The reference barometric pressure measurement/storage unit 1 stores a measurement result of an absolute pressure sensor 3a included in the current barometric pressure measurement unit 3 described later, for example, at a predetermined storage region as the reference barometric pressure. The position of the unit 1 may be a position outdoors or indoors of the building as a target for the recognition of the current floor by the barometric altimeter 100, and a position closer to the building as a target for the recognition of the current floor is preferred.

In general, the absolute value of the barometric pressure itself and the height or the altitude do not have always the same functional relationship, and the functional relationship varies over time. A major factor for the variation resides in a change in weather, such as generation of a high pressure system or a low pressure system. The functional relationship, however, is less affected by such a change in weather for a relatively short time period.

Then the reference barometric pressure measurement/storage unit 1 desirably operates at time intervals so as not to be affected by a change in barometric pressure due to a change in weather as stated above. It is recommended typically to measure the reference barometric pressure at time intervals of a few tens of minutes or shorter.

The barometric pressure/height conversion coefficient storage unit 2 is a block to store the functional relationship between barometric pressures and heights used for height calculation and parameter (coefficient) included in such a function beforehand. The details of this block will be described later.

The current barometric pressure measurement unit 3 is a block to measure the barometric pressure at the indoor position to be measured (hereinafter called an indoor measurement position as well) to find the floor number at the indoor measurement position. The barometric pressure at this block is measured by an absolute pressure sensor similarly to the measurement of barometric pressure at the reference barometric pressure measurement/storage unit 1. For instance, the current barometric pressure measurement unit 3 includes an absolute pressure sensor 3a, and measures the barometric pressure at the indoor measurement position by the absolute pressure sensor 3a.

The barometric pressure/height conversion coefficient calculation unit 4 is a block to calculate the functional relationship and the coefficient to be stored in the barometric pressure/height conversion coefficient storage unit 2. This barometric pressure/height conversion coefficient calculation unit 4 includes an input unit 4a to input temperature information and humidity information used for calculation of the functional relationship and the coefficients. The details of this block are described later.

The height calculation unit 5 is a block to calculate the height of the position as a target for height measurement (hereinafter this called an indoor measurement position as well), for which barometric pressure is measured using the current barometric pressure measurement unit 3, based on the reference barometric pressure stored in the reference barometric pressure measurement/storage unit 1, the coefficient stored in the barometric pressure/height conversion coefficient storage unit 2 and the barometric pressure measured at the current barometric pressure measurement unit 3. For a position in a high-rise building, for example, the floor number thereof also can be calculated. Alternatively the height can be simply calculated, or a variation in height from the position at which the reference barometric pressure is measured can be calculated as well. The height calculation unit 5 includes a display 5a to display the result of calculations at the height calculation unit 5.

The following describes processing operations at each block of FIG. 1, with reference to the flowchart of FIG. 2. Functions and numerical values such as coefficients described in the following are simply exemplifications, and they may be set optimally at the indoor measurement position or the like.

As illustrated in FIG. 2, as the processing at Step S1, the barometric pressure/height conversion coefficient calculation unit 4 firstly calculates the functional relationship between barometric pressures and heights and coefficients included in this function.

As one example, the functional relationship between barometric pressures and heights is specified as in the following expression (1):

$$H = -Psens \times P0 \times \log e(P/Pref) \qquad (1),$$

where "loge" in Expression (1) represents a natural logarithm having the base (e=2.71828) of the natural logarithm.

Then each letter in Expression (1) is defined as follows:
H: height (value obtained at the height calculation unit 5);
P: barometric pressure at the position to be measured (indoor measurement position) (value obtained at the current barometric pressure measurement unit 3);
Pref: reference barometric pressure (value obtained at the reference barometric pressure measurement/storage unit 1); and
Psens: barometric pressure/height conversion coefficient (value obtained at the barometric pressure/height conversion coefficient calculation unit 4).

P0 in Expression (1) is P0=1013.25 hPa, which is a fixed value. Note here that P0=1013.25 hPa is the reference barometric pressure value at sea level 0 m of the international standard atmosphere established in 1976. The height H found from Expression (1) is the height at the indoor measurement position with reference to the position at which the reference barometric pressure Pref is measured, i.e., a variation in height.

In order to embody the present invention, the value "P0" may be any fixed value, and specifically P0 used is the reference barometric pressure value 1013.25 hPa at sea level 0 m preferably.

Expression (1) is based on the quantitative relationship expression obtained assuming air as ideal gas and by modifying the expression to be applied to the present invention.

Subsequently the expression to calculate the barometric pressure/height conversion coefficient Psens as the coefficient in Expression (1) is defined as follows:

$$Psens = (R \times T)/(M0 \times G \times P0) \qquad (2),$$

where each letter in Expression (2) is defined as follows:
R: gas constant;
T: absolute temperature at the indoor measurement position;
M0: molecular weight of air at the indoor measurement position;
G: gravity acceleration at the indoor measurement; and
P0=1013.25 hPa (reference barometric pressure value at sea level 0 m of the international standard atmosphere).

Similarly to Expression (1), Expression (2) also is based on the quantitative relationship expression obtained assuming air as ideal gas and by modifying the expression to be applied to the present invention.

In Expression (2), the gas constant R is constant (R=8.31441 J/mol/K). The gravity acceleration G has the maximum at the equator for the earth as a whole, and has the minimum at north and south poles, which has a difference therebetween of about 0.5%, and so can be considered substantially constant. The following uses the international standard value G=9.80665 m/s/s specified in 1901.

Although the remaining values of molecular weight M0 and absolute temperature T can be found from the actual measurement, it is apparently difficult to derive these values based on this method, i.e., by actual measurement for the application to the present invention.

That is, as for the measurement of molecular weight M0, it is originally very difficult to measure the value. Molecular weight is the most influenced by humidity, and it is not so difficult to measure the humidity. In a strict sense, however, it requires finding the average humidity at the indoor measurement position, and so it is still difficult to measure such a value. The same as in humidity applies to the absolute temperature as well, resulting in that it is also difficult to measure the absolute temperature.

Meanwhile, for indoor use as a prerequisite of the present invention and in a high-rise building as a target, standards are set for the humidity that influences molecular weight M0 the most and the temperature to keep comfort for residents.

For example, according to the indoor environmental standard established by the Japanese Law for Maintenance of Sanitation in Buildings, they specify the humidity of 40% RH or higher and 70% RH (relative humidity) or lower and the temperature of 17° C. or higher and 28° C. or lower. Using such humidity and temperature specified as the indoor environmental standard, the molecular weight M0 of air can be derived as any value of 28.680 or more and 28.882 or less, and the absolute temperature can be derived as any value of 290.15 or more and 301.15 or less. That is, any numbers in these ranges can be assigned in Expression (2).

These ranges of temperatures and the like are standards just for indoor rooms in which residents are present by the Japanese national law. That is, in the case of worldwide applications or in the case of considering indoor rooms in which residents are not present (machine rooms, storage or the like) as well, for example, the temperature range is desirably expanded from 17° C. or higher and 28° C. or lower, and the humidity range also is expanded from 40% RH or higher and 70% RH or lower for application. For instance, the temperature range may be set at 15° C. or higher and 30° C. or lower, and the humidity range also may be set at 30% RH or higher and 80% RH or lower. Since the barometric altimeter according to the present invention is applicable similarly in the expanded temperature range and such a humidity range, the barometric pressure/height conversion coefficient Psens can be corrected more precisely than in conventional, resulting in that the height also can be measured more precisely.

For example, the molecular weight M0 is M0=28.795 for the most standard temperature of 25° C. and such humidity of 50% RH. When this value of M0 as well as other values are assigned, the resultant barometric pressure/height conversion coefficient Psens will be Psens=8.6639.

Humidity or temperature to be used for the calculation of the barometric pressure/height conversion coefficient Psens may be input through the input unit 4a included in the barometric pressure/height conversion coefficient calculation unit 4. For instance, a user may select values satisfying the humidity of 40% RH or higher and 70% RH or lower and the temperature of 17° C. or higher and 28° C. or lower that are specified as the indoor environmental standard for input setting. Alternatively, a user may select a molecular weight and a temperature which satisfy that the molecular weight M0 which is calculated based on the humidity and the temperature specified as the indoor environmental standard is any value of 28.680 or more and 28.882 or less, and the temperature specified as the indoor environmental standard for input setting.

A temperature sensor to measure temperature and a humidity sensor to measure humidity are provided as the input unit 4a, and the temperature and the humidity measured by these temperature sensor and humidity sensor may be set as the temperature and the humidity to be used for calculation of the barometric pressure/height conversion coefficient Psens.

The thus calculated barometric pressure/height conversion coefficient Psens as the numerical value has mathematical meaning that in the graph obtained by plotting barometric pressures in the X-axis (horizontal axis) and heights in the Y-axis (vertical axis), the tangent line at 1013.25 hPa in the X-axis has gradient that Psens=8.6639. Then, this numerical value has physical meaning that, at the position of the barometric pressure of 1013.25 hPa, the barometric pressure decreases by 1 hPa with vertically upward movement by 8.6639 m or the barometric pressure increases by 1 hPa with vertically downward movement by 8.6639 m.

As stated above, the description so far is to find the barometric pressure/height conversion coefficient Psens based on the prerequisite that air is ideal gas, and the barometric pressure/height conversion coefficient Psens may be calculated under another condition, such as in accordance with the Van Der Waals equation of state to approximate the relationship between pressure and volume.

Although the details are omitted, the differential equation given in this case cannot be solved analytically unlike the case of ideal gas, which will be solved by a numerical calculation method or the like.

The barometric pressure/height conversion coefficient Psens is calculated by such procedure, and the coefficient of the functional relationship in Expression (1) is specified. Then the procedure shifts to Step S2, where the barometric pressure/height conversion coefficient calculation unit 4 stores the calculated functional relationship and barometric pressure/height conversion coefficient Psens in the barometric pressure/height conversion coefficient storage unit 2.

The processing at these Step S1 and Step S2 may be performed at any place, including outdoors, indoors, an indoor measurement position and the like. However, when measurements by the temperature sensor and the humidity sensor are used for the temperature and the humidity to be used for the calculation of the barometric pressure/height conversion coefficient Psens, such measurements by the temperature sensor and the humidity sensor have to be acquired, and so the processing has to be performed indoors. Preferably it is performed in the building in which the indoor measurement position is located.

Next, the procedure shifts to Step S3, where the reference barometric pressure measurement/storage unit 1 stores the pressure measured at some position by the absolute pressure sensor 3a as reference barometric pressure.

For instance, when a user measures height by the barometric altimeter 100 to recognize what floor they are now on in the building, barometric pressure may be measured at a time when they enter the reference floor, e.g., the first floor in the building.

Next, the procedure shifts to Step S4, where the current barometric pressure measurement unit 3 measures barometric pressure by the absolute pressure sensor 3a at an indoor measurement position, such as at a higher floor.

Next the procedure shifts to Step S5, where the height calculation unit 5 calculates the height on the basis of various types of information acquired at Steps S1 to S4. That is, the height H is calculated from the functional relationship shown in Expression (1) calculated at Step S1, using the barometric pressure/height conversion coefficient Psens calculated at Step S1, the reference barometric pressure acquired at Step S3, and the pressure at the indoor measurement position acquired at Step S4.

Then in this case, in order to recognize what floor they are on, the current floor number is found by checking the calculated height H against known height information for each floor of the building, for example. That is, the height H obtained from Expression (1) is a variation in height from the position where the reference barometric pressure is measured, and the reference barometric pressure is measured at the first floor. This means that the floor number of the measurement position may be calculated based on the known height for each floor of the building, i.e., by dividing the height H by the height of each floor, whereby the floor number of the indoor measurement position can be found. The thus obtained calculation result is displayed at the display 5a. This allows the user to recognize the height or the floor number where the user is present.

As stated above, the reference barometric pressure has to be updated to the latest value at intervals of about 10 minutes. For instance, after the reference barometric pressure is acquired at the reference floor, such as the first floor of the building, then reference barometric pressure is acquired at a position different in height from the indoor measurement position at intervals of about 10 minutes (Step S3). Subsequently, the processing at Step S4 and Step S5 may be performed to acquire the height H, a variation in height from the floor where the reference barometric pressure may be measured, and then the height of the indoor measurement position may be acquired based on this.

As stated above, the functional relationship between barometric pressure and height indoors is specified as in Expression (1), and the height is calculated based on this functional relationship. This allows precise measurement of the height when the height indoors is measured using a barometric altimeter as well. Since the height is calculated using the functional relationship between barometric pressure and height indoors, the detection accuracy can be improved as compared with the case of measuring using a conventional barometric altimeter for outdoor use. Specifically it can have resolution of a few tens of floors, and so the current height (floor number) in a high-rise building also can be detected precisely.

Modification Example 1

As stated above, the reference barometric pressure measurement/storage unit 1 measures reference barometric pressure desirably at intervals of about a few tens of minutes at longest. The above describes the case where a user performs measurement operation of the reference barometric pressure, which is not a limiting example.

As stated above, the present invention is based on a prerequisite of using the barometric altimeter 100 indoors.

Herein three-dimensional positioning is often possible outdoors using a GPS (Global Positioning System). On the other hand, GPS radiowaves do not reach the inside such as in a high-rise building almost certainly. Then, the timing of entrance from the outside to the inside can be known by analyzing a signal from GPS radiowaves.

For instance, an observation instrument (a spectrum analyzer or a dedicated semiconductor component) capable of observing radiowave signal strength at 1575.42 MHz in GPS radiowaves that is used for consumer equipment and an observation signal processing unit configured to process an observation signal from the observation instrument are provided at the barometric altimeter 100.

Then as illustrated in the flowchart of FIG. 3, at Step S11, the observation signal processing unit firstly measures radiowave signal strength on the basis of an observation signal acquired by the observation instrument. Then the procedure shifts to Step S12, where it is determined as the entrance from the outside to the inside when the radiowave signal strength measured decreases suddenly. This determination may be made by detecting a difference in radiowave signal strength before and after entrance to the building beforehand, and setting a value corresponding to the difference as a threshold for a difference in variation of the radiowave signal strength. Then when the radiowave signal strength decreases by the threshold or more, it is determined that a user carrying the barometric altimeter 100 moves from the outside to the inside of the building.

Then the floor where the user is present when they move from the outside to the inside of the building is set as the reference floor, and the reference barometric pressure measurement/storage unit 1 acquires reference barometric pressure by the absolute pressure sensor at this position. Then this reference barometric pressure is stored at a predetermined storage region.

Subsequently, when the calculation of the functional relationship and the barometric pressure/height conversion coefficient are not performed, then the processing at Step S1 and Step S2 in FIG. 2 is performed at this timing. When the processing at Step S1 and Step S2 is performed, then the processing at Step S4 and Step S5 may be performed. With this configuration, a user can acquire reference barometric pressure at the reference floor automatically without consciously acquiring the reference barometric pressure information at the reference floor.

In the configuration such that the barometric pressure/height conversion coefficient Psens is calculated using the measurements by a temperature sensor and a humidity sensor and such that movement of a user from the outside to the inside is detected as stated above, then measurements by the temperature sensor and the humidity sensor may be acquired at the timing of the detection of movement of the user from the outside to the inside, and the barometric pressure/height conversion coefficient Psens may be calculated using these measurements.

Alternatively, positioning by WiFi communication, which is often used indoors, and the measurement of radiowave signal strength may be performed to implement a means similar to that by GPS as stated above. That is, the current position indoors can be recognized by WiFi positioning. Then the reference barometric pressure measurement/storage unit 1 may measure reference barometric pressure at the timing when the current position can be recognized, and the reference barometric pressure may be stored. That is, when the installation positions of the base stations (routers) for WiFi communication are known, the current position can be recognized from the radiowave signal strength in the WiFi communication with a plurality of base stations. Recognition of the current position means that the user is present inside of the building. Then, the current position of the user at the timing when the current position can be recognized may be considered as the reference floor or the reference height, where the reference barometric pressure is measured, and this may be stored.

In this case, the time when the reference barometric pressure is acquired is managed, and when measurement interval for the reference barometric pressure (e.g., a few tens of minutes) has passed, and if the user continuously is present in the same building, then reference barometric pressure may be automatically acquired so as to update the functional relationship expression (1) automatically.

Modification Example 2

The above embodiment describes the case of calculating the barometric pressure/height conversion coefficient Psens through the calculation by the barometric pressure/height conversion coefficient calculation unit 4 based on Expression (2), which is not a limiting example.

For instance, in the case of a country having four distinct seasons like Japan, it may be specified for simplification as follows.

Firstly in summer, considering the recent energy situation and tendency toward energy saving, it is desirable to control the temperature at 28° C. and the humidity at 70% RH that are the upper limit of indoor environmental standard by the Japanese Law for Maintenance of Sanitation in Buildings as stated above. In this case, the barometric pressure/height conversion coefficient Psens will be 8.7862. Conversely in winter, the barometric pressure/height conversion coefficient Psens calculated based on the lower limit of the temperature and the humidity of indoor environmental standard will be 8.4060.

In spring and fall, they may be specified as the average of these values, and the value of the barometric pressure/height conversion coefficient Psens will be 8.5961. The value in summer is higher by 2.21% and the value in winter is lower by 2.21% than the values in spring and fall.

Then, seasons and the barometric pressure/height conversion coefficients may be associated and stored in the barometric pressure/height conversion coefficient storage unit 2, for example, and then a season may be designated by the input unit 4*a*, whereby the height may be calculated using the barometric pressure/height conversion coefficient associated with the season.

Such a situation brings the following phenomenon during the actual operation.

Assuming the case where the barometric pressure/height conversion coefficient Psens in spring and fall only is stored, and the floor number of an indoor high-rise building where a user is present is to be measured in summer. When each floor in the high-rise building has the same height (the height between the first floor and the second floor, the height between the second floor and the third floor, the same applies hereinafter), the measurement by this barometric altimeter 100 leads to erroneous detection as the twenty-second floor, which should be the twenty-third floor actually, when the user moves upward from the first floor to the twenty-third floor. Conversely in winter, this leads to erroneous detection as the twenty-fourth floor. In order to cope with recent high-rise buildings, the resolution about fifty floors will be required. The present technique can achieve such resolution easily.

Of course, the method is not limited to the above, in which three barometric pressure/height conversion coefficients Psens for summer, spring and fall, and winter are set for four seasons, and the barometric pressure/height conversion coefficients Psens is corrected in accordance with the season. The present invention can correct the barometric pressure/height conversion coefficient Psens for each two months or three months or for each month as well as successively (in an analogue manner) for the date and the month, for example.

In this case, month information or month and date information at the time of height measurement may be input through the input unit 4*a*, whereby the height may be calculated using the barometric pressure/height conversion coefficient associated with this month information or month and date information. A user may input the month information or month and date information through the input unit 4*a*, or when the barometric altimeter 100 is equipped with a calendar function, the month information or month and date information may be acquired automatically through this calendar function, and the barometric pressure/height conversion coefficient associated with this may be specified.

Additionally, the conventional barometric altimeter is simply configured based on the air temperature outdoors or the air temperature and the barometric pressure at the sea level 0 m as stated at the beginning, or simply is based on a simple sea-level correction table. That is, when such a conventional barometric altimeter is used indoors, erroneous detection occurs more often for the floor number as the measurement is performed at a higher floor. On the other hand, simply application of the technique of the present invention can decrease the chance of erroneous detection at a higher floor greatly.

The scope of the present invention is not limited to the exemplified embodiments described and illustrated, and includes all embodiments bringing the effects equivalent to those intended for the present invention. The scope of the present invention further can be defined by every desired combination of specific features among the all features disclosed.

REFERENCE SIGNS LIST

1 reference barometric pressure measurement/storage unit
2 barometric pressure/height conversion coefficient storage unit
3 current barometric pressure measurement unit
3*a* absolute pressure sensor
4 barometric pressure/height conversion coefficient calculation unit
4*a* input unit
5 height calculation unit
5*a* display
100 barometric altimeter

The invention claimed is:

1. A barometric altimeter, comprising:
a pressure sensor;
a reference barometric pressure measurement storage unit configured to store a respective barometric pressure measurement, by the pressure sensor, at a respective height, as a reference barometric pressure;
a barometric pressure/height conversion coefficient storage unit configured to store:
a plurality of barometric pressure/height conversion coefficients to convert respective barometric pressure measurements, by the pressure sensor, to corresponding respective heights, and
an arithmetic expression using one of the plurality of barometric pressure/height conversion coefficients as appropriate,
wherein each of the plurality of barometric pressure/height conversion coefficients are calculated beforehand based on a respective temperature of air, indoors, in accordance with a particular respective date in a particular respective month so that the plurality of barometric pressure/height conversion coefficients correspond to a plurality of months and dates; and
a height calculation unit configured to receive a desired height-measurement month and date information as an input, and to calculate a corresponding height or a corresponding variation in height at a respective indoor measurement position on a basis of the reference barometric pressure and the arithmetic expression using a respective barometric pressure/height conversion coefficient corresponding to the inputted height-measurement month and date information, and on a basis of a barometric pressure measurement by the pressure sensor at the respective indoor measurement position.

2. The barometric altimeter according to claim 1, further comprising an indoor determination unit configured to detect whether the pressure sensor is present indoors or not.

3. The barometric altimeter according to claim 2, wherein the indoor determination unit detects whether the pressure sensor is present indoors or not based on a radio signal having respectively different indoor and outdoor signal strengths.

4. The barometric altimeter according to claim 3, wherein the radio signal is a WiFi signal or a GPS signal.

5. The barometric altimeter according claim 1, further comprising a barometric pressure/height conversion coefficient calculation unit configured to calculate the plurality of barometric pressure/height conversion coefficients, wherein
the barometric pressure/height conversion coefficient calculation unit calculates the barometric pressure/height conversion coefficients based on temperature of air indoors and molecular weight or humidity of air indoors.

6. The barometric altimeter according to claim 5, further comprising a temperature sensor configured to measure the temperature of the air indoors, wherein
the barometric pressure/height conversion coefficient calculation unit calculates the plurality of barometric pressure/height conversion coefficients based on measurements made by the temperature sensor.

7. The barometric altimeter according claim 1, further comprising: a barometric pressure/height conversion coefficient calculation unit configured to calculate the plurality of barometric pressure/height conversion coefficients; and a humidity sensor configured to measure humidity of air indoors, wherein
the barometric pressure/height conversion coefficient calculation unit calculates the barometric pressure/height conversion coefficients based on temperature of the air indoors and the measured humidity.

8. The barometric altimeter according to claim 1, wherein the plurality of barometric pressure/height conversion coefficients are set in accordance with four seasons, and a season when a height is measured is input as the height-measurement month and date information.

9. The barometric altimeter according to claim 1, wherein the arithmetic expression is defined as the following expression (1):

$$H = -P\text{sens} \times P0 \times \log_e(P/P\text{ref}) \quad (1),$$

wherein "loge" represents a natural logarithm having a base (e=2.71828) of the natural logarithm,
H=Height,
Psens=Barometric pressure/height conversion coefficient,
P0=Reference barometric pressure value at a sea level of 0 m of the international standard atmosphere,
P=Barometric pressure at the measurement position, and
Pref=Reference barometric pressure.

10. The barometric altimeter according to claim 9, wherein the barometric pressure/height conversion coefficient is defined as the following expression (2):

$$P\text{sens} = (R \times T)/(M0 \times G \times P0) \quad (2),$$

wherein:
R=gas constant,
T=absolute temperature at the indoor measurement position,
M0=molecular weight of air at the indoor measurement position, and
G=gravity acceleration at the indoor measurement position.

* * * * *